United States Patent [19]

Weiler

[11] 4,419,952
[45] Dec. 13, 1983

[54] TEMPERATURE INDICATING DEVICE ON TRAFFIC SURFACES

[76] Inventor: Wolfgang Weiler, Am Römerbrunnen 21, Frankfurt am Main, Fed. Rep. of Germany

[21] Appl. No.: 233,075

[22] Filed: Feb. 9, 1981

[30] Foreign Application Priority Data

Jan. 31, 1980 [DE] Fed. Rep. of Germany ....... 3003408

[51] Int. Cl.³ ...................... G01K 11/16; G01K 13/00
[52] U.S. Cl. .................................. 116/216; 374/109; 374/162
[58] Field of Search ................. 116/216, 221; 73/356, 73/362.8, 343 R, 336.5; 374/165, 109, 136, 120, 137

[56] References Cited

U.S. PATENT DOCUMENTS

| 3,018,663 | 1/1962 | Dunlop | 374/134 |
| 3,422,677 | 1/1969 | Lockwood | 73/336.5 |
| 3,433,075 | 3/1969 | Sutherland | 116/216 |
| 3,537,315 | 11/1970 | Ames | 374/165 |

FOREIGN PATENT DOCUMENTS

| 2619285 | 11/1977 | Fed. Rep. of Germany | 116/216 |
| 563045 | 6/1975 | Switzerland | 116/216 |

Primary Examiner—Charles E. Frankfort
Assistant Examiner—Denis E. Corr
Attorney, Agent, or Firm—Wenderoth, Lind & Ponack

[57] ABSTRACT

An apparatus for detecting and for optically indicating from afar the temperature condition of an upper layer of a road surface includes a thermally conductive temperature sensor positioned within the upper layer of the road surface to sense the temperature thereof. A temperature indicator is positioned on a post above the road surface. The temperature indicator includes a liquid crystal agent having a first optically perceivable condition substantially at a temperature above the freezing point of water and a second optically perceivable condition substantially at a temperature below the freezing point of water. A thermally conductive connector thermally connects the temperature sensor and the liquid crystal agent, such that the temperature sensed by the sensor is conveyed to the liquid crystal agent, whereby the liquid crystal agent exhibits the respective condition thereof representative of the temperature of the road surface.

5 Claims, 2 Drawing Figures

TEMPERATURE INDICATING DEVICE ON TRAFFIC SURFACES

BACKGROUND OF THE INVENTION

The temperature of the surface of the cover and, in certain areas, also of the foundation of a road has different influences, particularly of a dangerous or harmful nature. Dangers develop particularly for traffic on roads from different temperatures of adjacent road sections in the area of the melting point of water. Thus, sections of roads running across bridges are exposed to greater temperature fluctuations, especially to a faster cooling than the road sections adjacent to them, which can lead to a local ice formation on the bridge section of the road. One of the objectives of the invention is to warn the approaching motor vehicle driver of such a danger. Those authorized to maintain the roads have, among other duties, the duty of preventing or removing any danger which could arise from the road. This is the reason why the described phenomena is counteracted by distributing salt on the road. However, this is done preventively and amply when a decrease in the temperature is expected below the melting point of the water. The distribution of salt by duration and amount could be calculated more exactly if the temperature development around the freezing point could be observed more exactly and more simply. The salt leads to damage to the road and particularly on bridge structures. The damage increases with the duration of the action of the salt and with its concentration. Therefore, the costs for the necessary maintenance of the bridges depend also on the scope of the salt distribution.

SUMMARY OF THE INVENTION

In order to moderate these disadvantages, it is proposed with this invention to equip traffic surfaces and especially bridge sections with temperature indicating devices. The advantages obtained with the application of the invention are obvious. The salt distribution service can be limited to only distribute salt then and there where the temperature of the road surface or of the road cover has gone below the freezing point or will momentarily go below it. The decision is not based on the weather forecast or on the measured temperature of the air but on the much more exacting direct measurement of the temperature of the road surface. The new temperature indicating device will be such that it can be read while driving by and thus it warns drivers.

In a special design of the invention, the new device is arranged in such a way on the traffic surface that it indicates visibly from a distance (thus optically) the temperature of the road surface or of the top layer of the cover. It is sufficient in this instance, and therefore preferable, that the indication is visible from the direction or directions from which vehicles, particularly motor vehicles, can approach. This indication serves the purpose of warning the participants in the traffic of the danger of a sudden change in the friction conditions of the road owing to the fact that the temperature on the road surface has gone, preferably locally, below the freezing point. Such a warning is naturally especially important for drivers of vehicles which are moving fast, i.e. of motor vehicles. Other traffic participants also may benefit from this indication but the distance at which the indication can be visually recognized should be adjusted to the speed of motor vehicles, particularly motorcycles and passenger motorcars, and should be accordingly aligned in the longitudinal direction of the road. The warning or indication is directed towards the approaching traffic.

The device shall indicate the temperature in the environment of the melting point of water (freezing point). Instead of having the indication cover a certain temperature range, it can be expedient and also advantageous that it indicate only whether the temperature is above or below a certain threshold value. The motor vehicle driver is mainly interested in the freezing point as the threshold value. The salt distribution service will probably prefer a value somewhat above the freezing point.

Preferably, there serves for the optical indication a body or a substance whose optically perceivable properties can assume two different forms and which changes from the one form to the other one when the threshold value is exceeded.

Another essential feature consists of the fact that the indicating device is self-sufficient at its location from the point of view of energy. As a rule, the temperature change to be measured is concomitant with an energy exchange, and this can be utilized for the indication. In general, the energy requirement is on the low side. If electric energy should be additionally required, solar cells can be taken into consideration or general transducers which convert stray light or directed light into electric energy which, if necessary, can also be held in a small electric accumulator. These energy sources include also the light from the headlights of vehicles.

In an advantageous design, the temperature indicator is a liquid crystal agent. Given the material composition of a liquid crystal, its point of change can be predetermined, i.e. the point at which its optical properties change as a function of the temperature. The change in the appearance of the liquid crystal can be recognized in the light hitting the crystal.

In order to improve its perceivability, the indicating device should be installed on a higher level than the road cover or lane and at the edge of the lane. In order to give an illustrative comparison, attention is drawn to the known guide posts ("cat's-eyes") which are erected along the edge of roads and reflect the light from a headlight into that direction from which it comes. The new temperature indicating device can be designed in a similar manner. Especially taken into consideration is a reflection surface which is designed as a triple reflector or which acts in the nature of a triple reflector. For this purpose, a greater number of such elementary triple reflectors can be combined to form a reflection surface. The indicating device should be installed, as is known from the "cat's-eyes" devices, at such a level that the beam of the headlight of a motor vehicle falls on it with its approach. The indicating agent shall be reflecting and this in such a way that one component of its reflecting direction points into the longitudinal direction of the road so that the mentioned component looks towards the approaching vehicles. As mentioned before, the reflecting behavior shall be dependent on the temperature in this instance.

The liquid crystal agent acts, at the same time, as a temperature sensor. In order to keep the measuring agent (liquid crystal agent) at the temperature of the road surface or at that which prevails in the top layer of the road cover, the liquid crystal and indicating agent is, if necessary, connected with the point to be measured (road surface or road cover) by means of a thermal line. The thermal line should be thermally insulated. Since the temperature gradient is generally only very small between the road cover and a point at a distance of about one meter above the road surface, the insulation is not subject to high requirements.

The invention conveys also in general the knowledge of making optically perceivable the temperature or a continuous or sudden change in the temperature of a road surface or of a point in the upper road cover by means of a liquid crystal or a liquid crystal agent. A special feature of this type of indicator lies in its independence of additional electric energy.

BRIEF DESCRIPTION OF THE DRAWINGS

An exemplified embodiment of a post provided for the application of the invention is explained in more detail below with reference to the accompanying drawings, wherein.

DETAILED DESCRIPTION OF THE INVENTION

Figure 1:
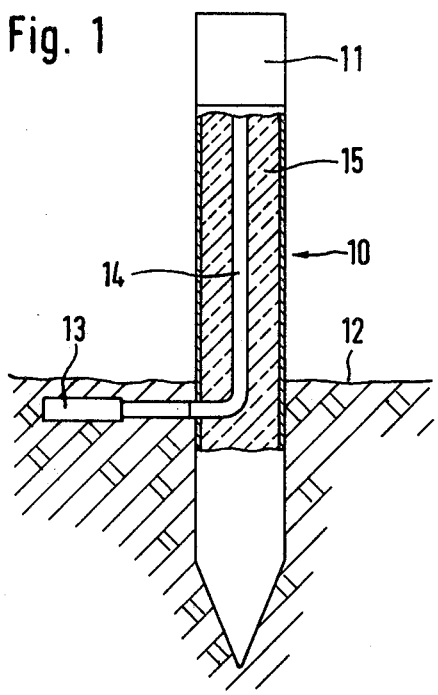
FIG. 1 is a partial longitudinal cross-section of a post in its installed position.
Figure 2:
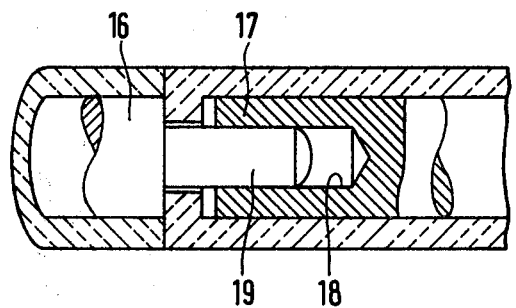
FIG. 2 is in the same cross-sectional representation but at a larger scale than in FIG. 1, a section of the post in the area of a road cover.

An indicator post 10 has a plaque 11, which is the front of a liquid crystal, facing along the road and mounted at the upper end of the post. The crystal is composed in such a manner that it has an optically effective crystal change near the freezing point of water. The temperature to be indicated shall be that of the upper layer of the road cover whose surface is shown by the reference number 12. Additionally, there is a temperature sensor at the point to be measured in the form of a thermally conductive metal component 13 which is connected with the crystal 11 by means of an also thermally conductive connection in the form of a rod 14, for example, of copper. In order to maintain the sensor 13 and the crystal 11 at the same temperature, the rod or line 14 is thermally insulated by insulation 15. For assembly reasons, the thermal line 14 can be interrupted at the outer circumference of the post 10. A thermal coupling is shown in FIG. 2. Accordingly, two rods consisting of a thermally conductive material are placed together in a close thermal contact at the coupling point. The contact can be improved by means of springs which however, are, not shown. The end of the thermal line on the sensor side is given the reference number 16 and that on the side of the post the reference number 17. In the illustrated example, the end 17 has a borehole 18 into which a tightly fitting pin 19 having a good thermal contact penetrates from the direction of the line 16. The insulation jackets pertaining to the two thermal conductor sections meet rigidly with each other in an insulating manner.

When in doubt, all features described and/or shown here are essential for the invention by themselves or in any reasonable combination.

I claim:

1. An apparatus for detecting and for optically indicating from afar only two different temperature conditions of an upper layer of a road surface, said apparatus comprising:

metal thermally conductive temperature sensor means, adapted to be positioned within an upper layer of a road surface, for sensing the temperature thereof;

a temperature indicator adapted to be positioned at a location above the road surface and at the edge of the road, said indicator including a liquid crystal agent having only a first optically perceivable condition substantially at a temperature above the freezing point of water and a second optically perceivable condition substantially at a temperature below the freezing point of water, said liquid crystal agent, depending on the temperature thereof, being changeable only between said first and second optically perceivable conditions; and a metal thermally conductive connecting means for thermally connecting said temperature sensor means and said liquid crystal agent, for thereby conveying the temperature sensed by said sensor means to said liquid crystal agent, and for thereby causing said liquid crystal agent to exhibit the respective said condition representative of said sensed temperature.

2. An apparatus as claimed in claim 1, further comprising an indicator post adapted to be installed in the road, and wherein said temperature indicator is positioned on said post, and said connecting means comprises a first length portion within said post and a second length portion adapted to be within the upper layer of the road surface and connected to said metal component.

3. An apparatus as claimed in claim 2, wherein at least said first length portion of said connecting means is surrounded by thermal insulation within said post.

4. An apparatus as claimed in claim 2, further comprising a thermal coupling thermally connecting said first and second length portions at an exit from said post.

5. An apparatus as claimed in claim 4, wherein said first and second length portions respectively comprise first and second thermally conductive rods positioned in close thermal contact by said thermal coupling, and further comprising first and second thermal insulation jackets respectively surrounding said first and second rods.

* * * * *